United States Patent
Song et al.

(10) Patent No.: US 8,564,982 B2
(45) Date of Patent: Oct. 22, 2013

(54) INTERLEAVED POWER FACTOR COMPENSATION CIRCUIT CONTROLLER

(75) Inventors: Ho Gul Song, Suwon-si (KR); Kyoung Hoe Kim, Suwon-si (KR); Jong Hun Ha, Suwon-si (KR); Dae Hee Han, Yongin-si (KR); Yong Wook Kim, Ansan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 238 days.

(21) Appl. No.: 13/137,602

(22) Filed: Aug. 29, 2011

(65) Prior Publication Data

US 2012/0056604 A1   Mar. 8, 2012

(30) Foreign Application Priority Data

Sep. 6, 2010   (KR) .......................... 10-2010-0087101

(51) Int. Cl.
*H02M 1/12* (2006.01)
*H02M 1/14* (2006.01)

(52) U.S. Cl.
USPC .................. 363/44; 363/46; 363/84; 363/89; 323/222; 323/223; 323/266

(58) Field of Classification Search
USPC ............ 363/44, 46, 84, 89; 323/222, 223, 266
See application file for complete search history.

(56) References Cited

U.S. PATENT DOCUMENTS

| | | | | | |
|---|---|---|---|---|---|
| 4,683,529 | A | * | 7/1987 | Bucher, II | 363/44 |
| 5,568,041 | A | * | 10/1996 | Hesterman | 323/207 |
| 5,627,708 | A | * | 5/1997 | Lee | 361/18 |
| 5,856,917 | A | * | 1/1999 | Aonuma et al. | 363/21.04 |
| 5,982,649 | A | * | 11/1999 | Turner | 363/89 |
| 6,661,684 | B2 | * | 12/2003 | Morita | 363/89 |
| 7,149,097 | B1 | * | 12/2006 | Shteynberg et al. | 363/16 |
| 7,535,734 | B2 | * | 5/2009 | Li et al. | 363/21.01 |
| 2006/0146579 | A1 | * | 7/2006 | Lu | 363/16 |
| 2010/0128503 | A1 | * | 5/2010 | Liu et al. | 363/89 |

* cited by examiner

*Primary Examiner* — Bao Q Vu
(74) *Attorney, Agent, or Firm* — Staas & Halsey LLP

(57) ABSTRACT

A power supply circuit to detect whether or not abnormal current is generated in a power factor compensation circuit and forcibly stop an operation of an interleaved power factor compensation circuit controller if abnormal current is generated. The power supply circuit includes a rectifier, a power factor compensation circuit including a plurality of reactors, a plurality of switches and a plurality of current detectors, a power factor compensation circuit controller to control switching of the switches and to control a power factor compensation operation, and a power factor compensation circuit protection circuit to receive the voltages output from the plurality of current detectors and to stop the operation of the power factor compensation circuit controller if at least one of the voltages output from the plurality of current detectors is abnormal. Thus, it is possible to prevent failure of the switches and the current detectors due to abnormal current.

15 Claims, 5 Drawing Sheets

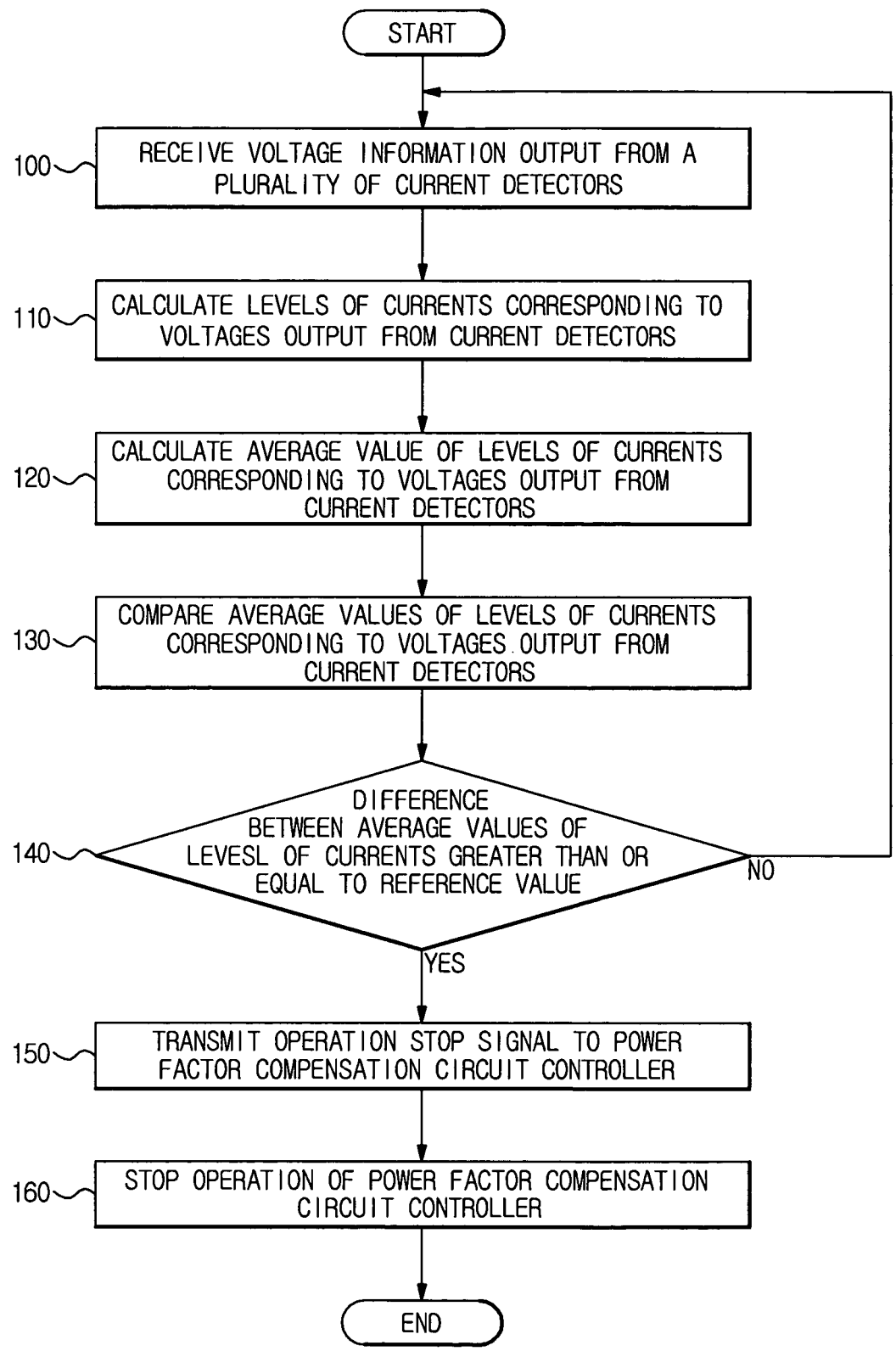

INTERLEAVED POWER FACTOR COMPENSATION CIRCUIT CONTROLLER

CROSS-REFERENCE TO RELATED APPLICATIONS

This application claims the benefit of Korean Patent Application No. 2010-0087101, filed on Sep. 6, 2010 in the Korean Intellectual Property Office, the disclosure of which is incorporated herein by reference.

BACKGROUND

1. Field

Embodiments of the present disclosure relate to a power supply circuit to protect a power factor compensation circuit from abnormal current.

2. Description of the Related Art

In general, an inverter is a voltage conversion device to convert a DC voltage into a 3-phase AC voltage (U, V and W) having a certain variable frequency and has been widely used in control of motors employed in electrical products such as washing machines, refrigerators, air conditioners or elevators due to energy efficiency and output control easiness.

A circuit to rectify a normal AC voltage into a DC voltage and to smooth the DC voltage is connected to an inverter. The voltage rectified and smoothed by the circuit is supplied to the inverter. The power factor of the rectifying circuit is as low as about 0.5 to 0.6. In addition, the power factor is decreased due to a phase difference between an input voltage (the normal AC voltage) and input current (normal AC current) and thus power consumption loss occurs due to reactive power.

In order to prevent such loss, an active power factor compensation circuit to improve a power factor using one inductor having a relatively small size and a switching element using the principle of a boost DC-DC converter was used. However, the active power factor compensation circuit is advantageous in that the inductor having a relatively small size is used and a DC voltage is greater than a peak voltage of an input voltage, but is disadvantageous in that efficiency is poor and switching frequency is increased in order to reduce ripple current generated due to switching of the inductor and thus switching loss is increased. In order to solve such disadvantages, an interleaved power factor compensation circuit to perform a power factor compensation operation by connecting two active power factor compensation circuits together in parallel has been developed.

SUMMARY

Therefore, it is an aspect of the present disclosure to provide a power supply circuit to detect whether or not abnormal current is generated in an interleaved power factor compensation circuit and forcibly stopping an operation of the interleaved power factor compensation circuit if abnormal current is generated.

Additional aspects of the disclosure will be set forth in part in the description which follows and, in part, will be apparent from the description, or may be learned by practice of the disclosure.

In accordance with one aspect of the present disclosure, there is provided a power supply circuit including a rectifier to rectify a voltage output from a power source; a power factor compensation circuit including a plurality of reactors to store and output currents output from the rectifier, a plurality of switches switched such that the currents are stored in the reactors or are output, and a plurality of current detectors to output voltages according to the currents from the reactors; a power factor compensation circuit controller to control switching of the switches and to control a power factor compensation operation; and a power factor compensation circuit protection circuit to receive the voltages output from the plurality of current detectors and to stop the operation of the power factor compensation circuit controller if at least one of the voltages output from the plurality of current detectors is abnormal.

The power factor compensation circuit may be an interleaved power factor compensation circuit which further includes a plurality of reverse current prevention diodes and the numbers of the reactors, the number of switches corresponding to the number of reverse current prevention diodes.

The power factor compensation circuit protection circuit may include a plurality of comparators to receive the output voltages of the plurality of current detectors and a reference voltage, and each of the comparators may compare the output voltage with the reference voltage and output an error signal according to the result of comparing the output voltage with the reference voltage.

When an error signal is output from at least one of the plurality of comparators, the operation of the power factor compensation circuit controller may be stopped.

The stopping of the operation of the power factor compensation circuit controller may switch the switches off such that current does not flow in the switches and the current detectors.

In accordance with another aspect of the present disclosure, there is provided a power supply circuit including a rectifier to rectify a voltage output from a power source; a power factor compensation circuit including a plurality of reactors to store and output currents output from the rectifier, a plurality of switches switched such that the currents are stored in the reactors or are output, and a plurality of current detectors to output voltages according to the currents from the reactors; a power factor compensation circuit controller to control switching of the switches and to control a power factor compensation operation; and a power factor compensation circuit protection circuit to calculate the levels of currents according to the voltages output from the plurality of current detectors and to stop the operation of the power factor compensation circuit controller according to a difference between the levels of the currents.

In the stopping of the operation of the power factor compensation circuit controller according to the difference between the levels of the currents, the operation of the power factor compensation circuit controller may be stopped if the difference between the levels of the currents according to the output voltages of the plurality of current detectors is greater than or equal to a predetermined value.

The power factor compensation circuit may be an interleaved power factor compensation circuit which further includes a plurality of reverse current prevention diodes and the numbers of the reactors, the number of switches corresponding to the number of reverse current prevention diodes.

The power factor compensation circuit protection circuit may include a comparator, and the comparator may calculate the levels of the currents according to the voltages output from the plurality of current detectors, calculate average values of the levels of the currents, and compare the average values.

The comparator may output an operation stop signal to the power factor compensation circuit controller if the difference between the average values of the levels of the currents output from the plurality of current detectors is greater than or equal to the predetermined value.

The power factor compensation circuit controller may control the switches to be switched off such that the current does not flow in the switches and the current detectors if the operation stop signal is received.

The current detectors may be current transformers to output voltages corresponding to input currents.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a flowchart illustrating an operation of a protection unit of an interleaved power factor compensation circuit according to an embodiment of the present disclosure.

DETAILED DESCRIPTION

Figure 1A:
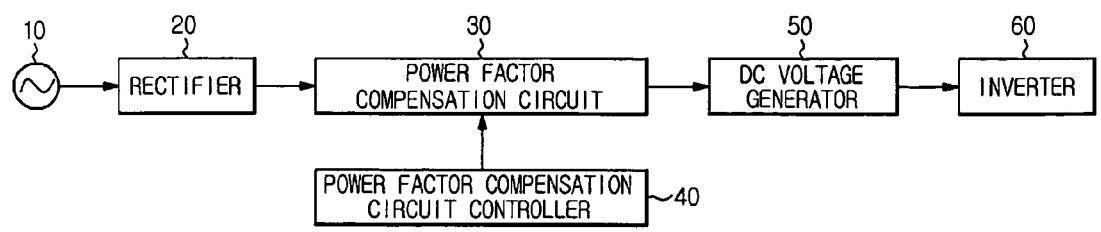
FIG. 1A is a block diagram of a power supply circuit including an interleaved power factor compensation circuit.

Reference will now be made in detail to the embodiments of the present disclosure, examples of which are illustrated in the accompanying drawings, wherein like reference numerals refer to like elements throughout.

Figure 1B:
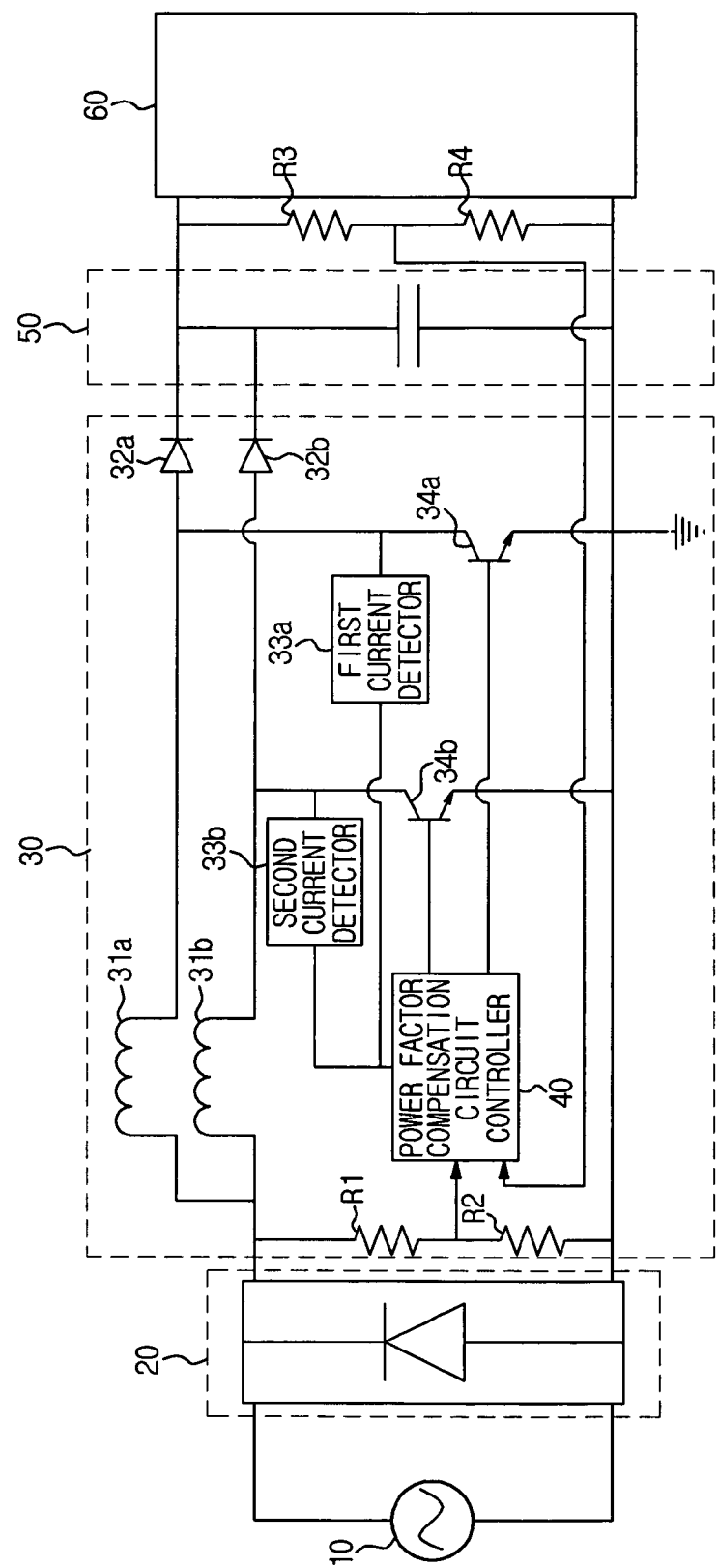
FIG. 1B is a circuit diagram of a power supply circuit including an interleaved power factor compensation circuit.

FIG. 1A is a block diagram of a power supply circuit including an interleaved power factor compensation circuit, and FIG. 1B is a circuit diagram of a power supply circuit including an interleaved power factor compensation circuit.

The power supply circuit including the interleaved power factor compensation circuit includes a normal power source 10, a rectifier 20, a power factor compensation circuit 30, a power factor compensation circuit controller 40, and a DC voltage generator 50. An inverter 60 is connected to the DC voltage generator 50.

The rectifier 20 primarily rectifies AC voltage output by the normal power source 10. The rectifier 20 is a bridge type rectifier including four diodes.

The power factor compensation circuit 30 may include reactors 31a and 31b to receive the output of the rectifier 20, reverse current prevention diodes 32a and 32b respectively connected to output ports of the reactors 31a and 31b, switches 34a and 34b rapidly switched such that phase differences between voltage and current of the output signals are not generated, and current detectors 33a and 33b to detect the level of current.

The reactors 31a and 31b may include two or more boost inductors. The reactors 31a and 31b charge current if the switches 34a and 34b are switched on and discharge the charged current if the switches 34a and 34b are switched off.

The reverse current prevention diodes 32a and 32b prevent current from flowing from the DC voltage generator 50 to the normal power source 10. Two or more reverse current prevention diodes 32a and 32b may be provided in correspondence with the reactors 31a and 31b.

The switches 34a and 34b are rapidly switched according to a signal of the power factor compensation circuit controller 40. The switches 34a and 34b are rapidly switched such that the phase difference between the voltage and current of the signal output to the inverter 60 is not generated. Insulated-gate bipolar transistor (IGBT) switches may be used as the switches 34a and 34b and two or more switches may be provided in correspondence with the number of reactors 31a and 31b.

The current detectors 33a and 33b may receive the current and output voltages corresponding thereto. Known current sensors such as current transformers may be used as the current detectors 33a and 33b. In the current transformer, a coil is wound on a circular core, and, when primary current flows through a hole of the circular core, a voltage is generated at a secondary side according to a turn ratio of the coil. The level of the primary current may be estimated by the level of the generated voltage.

Two or more current detectors 33a and 33b may be provided in correspondence with the number of reactors 31 and 31b. The current detectors 33a and 33b output voltages proportional to or inversely proportional to the levels of the currents output from the reactors 31a and 31b and transmit the voltage information to the power factor compensation circuit controller 40.

The power factor compensation circuit controller 40 controls the switching operations of the switches 34a and 34b through Pulse Width Modulation (PWM). The power factor compensation circuit controller 40 rapidly switches the switches 34a and 34b such that the phases of the currents of the reactors 31a and 31b follow the phase of the input voltage through PWM. If the switches 34a and 34b are switched on, the voltage rectified by the rectifier 20 is applied to the reactors 31a and 31b and the reactor currents are linearly increased. At this time, the reverse current prevention diodes 32a and 32b are turned off by reverse voltages and the energy charged in the DC voltage generator 50 is supplied to the inverter 60. In contrast, if the switches 34a and 34b are switched off, the reverse current prevention diodes 32a and 32b are turned on such that a voltage obtained by subtracting the input voltage from the output voltage is applied to the reactors 31a and 31b and the reactor current is linearly decreased. At this time, while power is supplied from the input stage to the output stage, the voltage is charged in the DC voltage generator 50. If the above-described operation is repeated, the power factor is improved while the reactor current follows the phase of the input voltage.

The power factor compensation circuit controller 40 may control switching of the IGBT switches 34a and 34b according to the voltage information transmitted from the current detectors 33a and 33b.

A large capacitor may be used as the DC voltage generator 50. The DC voltage generator 50 receives a signal having an improved power factor from the power factor compensation circuit 30 and generates a DC voltage using the received signal.

FIGS. 1A and 1B show the interleaved power factor compensation circuit. A protection unit of the interleaved power factor compensation circuit will now be described.

Figure 2A:
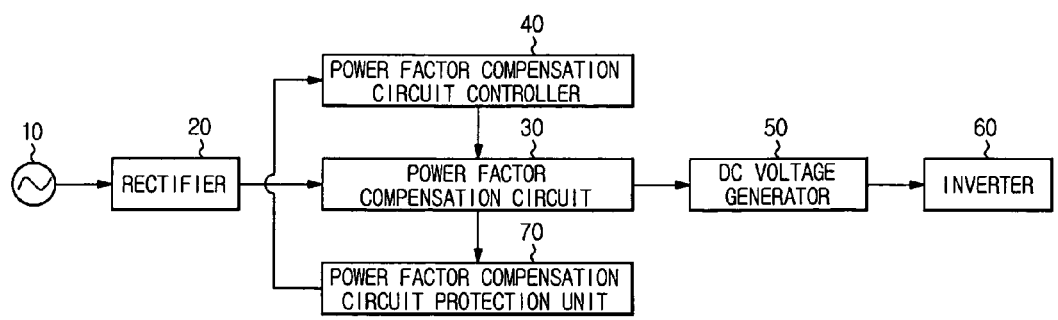
FIG. 2A is a block diagram of a power supply circuit including a protection unit of an interleaved power factor compensation circuit according to an embodiment of the present disclosure.
Figure 2B:
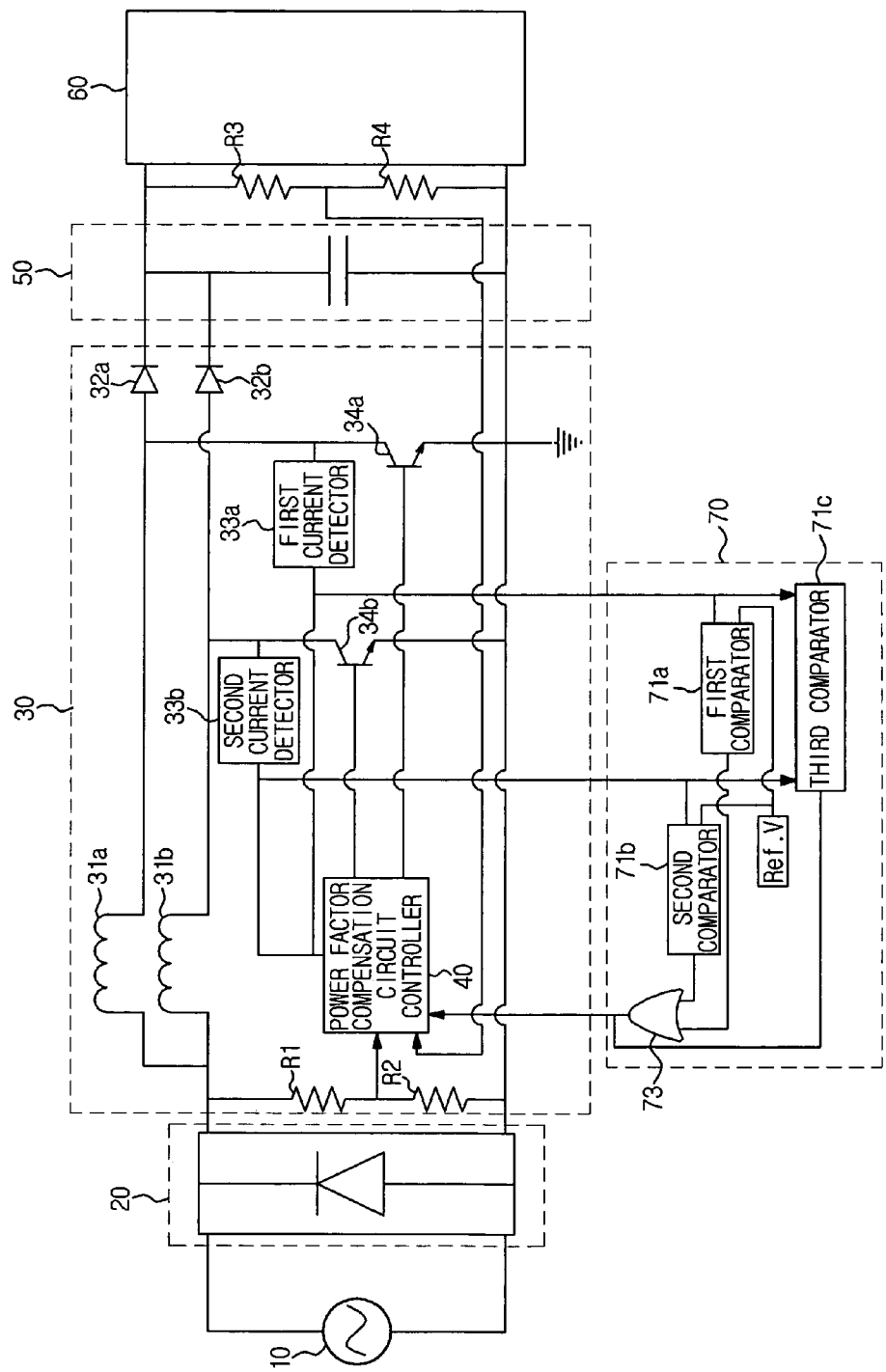
FIG. 2B is a circuit diagram of a power supply circuit including a protection unit of an interleaved power factor compensation circuit according to an embodiment of the present disclosure.

FIG. 2A is a block diagram of a power supply circuit including a protection unit of an interleaved power factor compensation circuit according to an embodiment of the present disclosure, FIG. 2B is a circuit diagram of a power supply circuit including a protection unit of an interleaved power factor compensation circuit according to an embodiment of the present disclosure.

The same components FIGS. 1A and 1B are denoted by the same reference numerals and the same terms and a description thereof will be omitted.

The power supply circuit including the interleaved power factor compensation circuit includes a normal power source 10, a rectifier 20, a power factor compensation circuit 30, a power factor compensation circuit controller 40, a power factor compensation circuit protection unit 70, and a DC voltage generator 50. An inverter 60 is connected to the DC voltage generator 50.

The power factor compensation circuit protection unit 70 may include a first comparator 71a, a second comparator 71b, a third comparator 71c and an OR gate 73.

The first comparator 71a and the second comparator 71b receive the voltages output from current detectors 33a and 33b and compare the voltages with a reference voltage Ref.V, respectively. The first comparator 71a and the second comparator 71b output error signals if the voltages output from the current detectors 33a and 33b are abnormal. It may be determined that the voltages output from the current detectors 33a and 33b are abnormal if the output voltages are greater than a first reference voltage or if the output voltages are less than a second reference voltage. The determination may change according to the method of designing the current detectors 33a and 33b. For example, in the case where each of the current detectors 33a and 33b outputs a voltage proportional to the input current, since overcurrent flows if the output voltage is greater than the first reference voltage, it is determined that abnormal current is output. In the case where each of the current detectors 33a and 33b outputs a voltage inversely proportional to the input current, since overcurrent flows if the output voltage is less than the second reference voltage, it is determined that abnormal current is output. Here, the first reference voltage and the second reference voltage are set to different voltage values by a designer.

The first comparator 71a and the second comparator 71b may output error signals if the voltages output from the current detectors 33a and 33b exceed a reference voltage. The error signal may be a high signal or a low signal. In the embodiment of FIGS. 2A and 2B, it is assumed that the error signal is a high signal.

The OR gate 73 receives the output signals of the first comparator 71a and the second comparator 71b. The OR gate 73 outputs a digital signal "1" if at least one of the digital signals output from the first comparator 71a and the second comparator 71b is "1". Here, the digital signal "1" indicates that the level of the voltage is in a range of 2 to 6 V and the digital signal "0" indicates that the level of the voltage is in a range of 0 to 2 V. The criterion may be changed according to design. If the digital signal "1" is output, a high signal is output and, if the digital signal "0" is output, a low signal is output.

If the digital signal output from the OR gate 73 is "1", the operation of the power factor compensation circuit controller 40 is stopped. When at least one of the two inputs of the OR gate 73 is "1", the OR gate 73 outputs the digital signal "1". The signals output from the first comparator 71a and the second comparator 71b are input to the OR gate 73. In the embodiment of FIGS. 2A and 2B, if the first comparator 71a and the second comparator 71b output the digital signal "1", then it indicates that the voltages output from the current detectors 33a and 33b are greater than the reference voltage. When overcurrents are output from the reactors 31a and 31b or overcurrents are output from the current detectors 33a and 33b, the voltages output from the current detectors 33a and 33b are greater than the reference voltage.

If the normal power source 10 is abnormal or if the reactors 31a and 31b are abnormal, overcurrents are output from the reactors 31a and 31b. If the normal power source 10 is abnormal, if the reactors 31a and 31b are abnormal, or if the current detectors 33a and 33b are abnormal, overcurrents are output from the current detectors 33a and 33b.

The third comparator 71c receives the voltages output from the current detectors 33a and 33b, converts the voltage information and calculates an average value of the currents. The levels of the currents corresponding to the output voltages of the current detectors 33a and 33b may be calculated and the levels of instantaneous currents may be averaged for a predetermined time so as to obtain an average value.

The third comparator 71c compares the average value of the current corresponding to the voltage output from any one of the plurality of current detectors 33a and 33b with the average of the current corresponding to the voltage output from the other of the current detectors 33a and 33b and transmits an operation stop signal to the power factor compensation circuit controller 40 if a difference between the average values is greater than or equal to a predetermined value.

Although the OR gate 73 is used in the power factor compensation circuit protection unit 70 in the above-described embodiment, another logic gate or another circuit configuration may be used. If an AND gate is used, the comparators 71a and 71b may be designed to output a low signal as an error signal if an input voltage is greater than a reference voltage and the power factor compensation circuit controller 40 may be designed such that operation thereof is stopped if the signal output from the AND gate is a low signal.

In another embodiment of the present disclosure, the current detectors 33a and 33b may be designed to output voltages which are inversely proportional to the input currents and each of the comparators 71a and 71b may output a high signal as an error signal to the OR gate 73 if the input voltages are less than the reference voltage.

As described above, various logic gates or circuit configurations may be used instead of the OR gate 73, the current detectors 33a and 33b may output the voltages proportional to or inversely proportional to the input currents, and each of the comparators 71a and 71b compares the input voltage with the reference voltage and output one of a low signal or a high signal according to the difference between the voltage.

Two cases where the power factor compensation circuit is protected by the interleaved power factor compensation circuit protection unit 70 according to the embodiment of the present disclosure will be described.

There are the case where voltage output from at least one of the current detectors 33a and 33b is greater than the reference voltage and the case where the difference between the average values of the plurality of currents calculated using the voltages output from the plurality of current detectors 33a and 33b is greater than or equal to a predetermined value. In the former case, a predetermined signal is sent to the power factor compensation circuit controller 40 using the first comparator 71a, the second comparator 71b and the OR gate 73 such that the operation of the power factor compensation circuit controller 40 is stopped in a hardware manner. In contrast, in the latter case, the third comparator 71c calculates the difference and sends an operation stop signal to the power factor compensation circuit controller 40 such that the operation of the power factor compensation circuit controller 40 is stopped in a software manner. The third comparator 71c may be a microcomputer. Hereinafter, the latter case using the third comparator 71c will be described.

FIG. 3 is a flowchart illustrating an operation of a protection unit of an interleaved power factor compensation circuit according to an embodiment of the present disclosure.

The third comparator 71c included in the power factor compensation circuit protection unit 70 receives the voltage information output from the plurality of current detectors 33a and 33b. The current detectors 33a and 33b output voltages corresponding to the input currents, which depend on load resistance and coil turns of the current detectors 33a and 33b. The third comparator 71c stores the design rules of the current detectors 33a and 33b in advance and calculates the current values corresponding to the voltages output from the current detectors 33a and 33b according to the design rules (100 and 110).

Next, the third comparator 71c calculates the average values of the phases of the currents calculated in real time and compares the plurality of average values (120 and 130).

Next, the third comparator 71c determines that abnormal current is generated if the difference between the plurality of average values is greater than or equal to a predetermined value and transmits an operation stop signal to the power factor compensation circuit controller 40, and the power factor compensation circuit controller 40 is stopped when the operation stop signal is received (140 and 150).

According to the embodiments of the present disclosure, it is possible to prevent failure of power elements due to abnormal current.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A power supply circuit comprising:
   a rectifier to rectify a voltage output from a power source;
   a power factor compensation circuit including a plurality of reactors to store and output currents output from the rectifier, a plurality of switches switched such that the currents are stored in the reactors or are output, and a plurality of current detectors to output voltages according to the currents from the reactors;
   a power factor compensation circuit controller to control switching of the switches and to control a power factor compensation operation; and
   a power factor compensation circuit protection circuit to receive the voltages output from the plurality of current detectors and to stop the operation of the power factor compensation circuit controller if at least one of the voltages output from the plurality of current detectors is abnormal.

2. The power supply circuit according to claim 1, wherein the power factor compensation circuit is an interleaved power factor compensation circuit which further includes a plurality of reverse current prevention diodes and the numbers of the reactors, the number of switches corresponding to the number of reverse current prevention diodes.

3. The power supply circuit according to claim 1, wherein the power factor compensation circuit protection circuit includes a plurality of comparators to receive the output voltages of the plurality of current detectors and a reference voltage, and
   each of the comparators compares the output voltage with the reference voltage and outputs an error signal according to the result of comparing the output voltage with the reference voltage.

4. The power supply circuit according to claim 3, wherein, when an error signal is output from at least one of the plurality of comparators, the operation of the power factor compensation circuit controller is stopped.

5. The power supply circuit according to claim 4, wherein the stopping of the operation of the power factor compensation circuit controller switches the switches off such that current does not flow in the switches and the current detectors.

6. A power supply circuit comprising:
   a rectifier to rectify a voltage output from a power source;
   a power factor compensation circuit including a plurality of reactors to store and output currents output from the rectifier, a plurality of switches switched such that the currents are stored in the reactors or are output, and a plurality of current detectors to output voltages according to the currents from the reactors;
   a power factor compensation circuit controller to control switching of the switches and to control a power factor compensation operation; and
   a power factor compensation circuit protection circuit to calculate the levels of currents according to the voltages output from the plurality of current detectors and to stop the operation of the power factor compensation circuit controller according to a difference between the levels of the currents.

7. The power supply circuit according to claim 6, wherein, in the stopping of the operation of the power factor compensation circuit controller according to the difference between the levels of the currents, the operation of the power factor compensation circuit controller is stopped if the difference between the levels of the currents according to the output voltages of the plurality of current detectors is greater than or equal to a predetermined value.

8. The power supply circuit according to claim 6, wherein the power factor compensation circuit is an interleaved power factor compensation circuit which further includes a plurality of reverse current prevention diodes and the numbers of the reactors, the number of switches corresponding to the number of reverse current prevention diodes.

9. The power supply circuit according to claim 6, wherein the power factor compensation circuit protection circuit includes a comparator, and the comparator calculates the levels of the currents according to the voltages output from the plurality of current detectors, calculates average values of the levels of the currents, and compares the average values.

10. The power supply circuit according to claim 9, wherein the comparator outputs an operation stop signal to the power factor compensation circuit controller if the difference between the average values of the levels of the currents output from the plurality of current detectors is greater than or equal to the predetermined value.

11. The power supply circuit according to claim 10, wherein the power factor compensation circuit controller controls the switches to be switched off such that the current does not flow in the switches and the current detectors if the operation stop signal is received.

12. The power supply circuit according to claim 6, wherein the current detectors are current transformers to output voltages corresponding to input currents.

13. The power supply circuit according to claim 6, wherein the power factor compensation circuit protection circuit includes a first comparator, a second comparator, a third comparator and a logic gate.

14. The power supply circuit according to claim 13, wherein the first comparator and the second comparator are configured to output error signals to the logic gate if the voltages output from the plurality of current detectors are abnormal, the voltages output from the plurality of current detectors being abnormal if the output voltages are greater than a first reference voltage or if the output voltages are less than a second reference voltage.

15. The power supply circuit according to claim 13, wherein the third comparator is configured to receive the voltages output from the plurality of current detectors, convert the voltage information and calculate an average value of the currents, compare the average value of the current corresponding to the voltage output from any one of the plurality of current detectors with the average of the current corresponding to the voltage output from the other of the plurality of current detectors and transmit an operation stop signal to the power factor compensation circuit controller if a difference between the average values is greater than or equal to a predetermined value.

* * * * *